(12) United States Patent
Lee et al.

(10) Patent No.: US 8,504,362 B2
(45) Date of Patent: Aug. 6, 2013

(54) NOISE REDUCTION FOR SPEECH RECOGNITION IN A MOVING VEHICLE

(75) Inventors: Sung Joo Lee, Daejeon (KR); Ho-Young Jung, Daejeon (KR); Jeon Gue Park, Daejeon (KR); Hoon Chung, Daejeon (KR); Yunkeun Lee, Daejeon (KR); Byung Ok Kang, Daejeon (KR); Hyung-Bae Jeon, Daejeon (KR); Jong Jin Kim, Daejeon (KR); Ki-young Park, Daejeon (KR); Euisok Chung, Daejeon (KR); Ji Hyun Wang, Daejeon (KR); Jeom Ja Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 997 days.

(21) Appl. No.: 12/506,705

(22) Filed: Jul. 21, 2009

(65) Prior Publication Data

US 2010/0161326 A1 Jun. 24, 2010

(30) Foreign Application Priority Data

Dec. 22, 2008 (KR) .................. 10-2008-0131369

(51) Int. Cl.
*G10L 15/20* (2006.01)
*G10L 15/00* (2006.01)
*G10L 19/00* (2006.01)
*G10L 19/02* (2006.01)
*G10L 15/14* (2006.01)

(52) U.S. Cl.
USPC ........... 704/233; 704/231; 704/216; 704/226; 704/256.7

(58) Field of Classification Search
USPC ................. 704/205, 207, 210, 226, 233, 236
See application file for complete search history.

(56) References Cited

U.S. PATENT DOCUMENTS 6,044,343 A * 3/2000 Cong et al. .............. 704/236
6,424,942 B1 * 7/2002 Mustel et al. ........... 704/233

(Continued)

FOREIGN PATENT DOCUMENTS

KR 10-2003-0078218 10/2003
KR 10-2007-0061216 6/2007

(Continued)

OTHER PUBLICATIONS

Junmei Bai; Rong Zheng; Bo Xu; Shuwu Zhang; , "Robust speaker recognition integrating pitch and Wiener filter," Chinese Spoken Language Processing, 2004 International Symposium on , vol., no., pp. 69-72, Dec. 15-18, 2004.*

(Continued)

*Primary Examiner* — Pierre-Louis Desir
*Assistant Examiner* — Matthew Baker
(74) *Attorney, Agent, or Firm* — Staas & Halsey LLP (57) ABSTRACT

A speech recognition system includes: a speed level classifier for measuring a moving speed of a moving object by using a noise signal at an initial time of speech recognition to determine a speed level of the moving object; a first speech enhancement unit for enhancing sound quality of an input speech signal of the speech recognition by using a Wiener filter, if the speed level of the moving object is equal to or lower than a specific level; and a second speech enhancement unit enhancing the sound quality of the input speech signal by using a Gaussian mixture model, if the speed level of the moving object is higher than the specific level. The system further includes an end point detection unit for detecting start and end points, an elimination unit for eliminating sudden noise components based on a sudden noise Gaussian mixture model.

18 Claims, 7 Drawing Sheets

U.S. PATENT DOCUMENTS

| | | | |
|---|---|---|---|
| 6,449,594 B1* | 9/2002 | Hwang et al. | 704/233 |
| 6,529,872 B1* | 3/2003 | Cerisara et al. | 704/250 |
| 6,691,091 B1* | 2/2004 | Cerisara et al. | 704/255 |
| 6,889,189 B2* | 5/2005 | Boman et al. | 704/270 |
| 7,117,145 B1* | 10/2006 | Venkatesh et al. | 704/200 |
| 7,139,711 B2 | 11/2006 | Grover | |
| 7,302,393 B2* | 11/2007 | Fischer et al. | 704/254 |
| 7,457,745 B2* | 11/2008 | Kadambe et al. | 704/216 |
| 7,487,084 B2* | 2/2009 | Aaron et al. | 704/231 |
| 7,590,530 B2* | 9/2009 | Zhao et al. | 704/226 |
| 7,590,589 B2* | 9/2009 | Hoffberg | 705/37 |
| 7,676,363 B2* | 3/2010 | Chengalvarayan et al. | 704/233 |
| 7,725,316 B2* | 5/2010 | Chengalvarayan et al. | 704/234 |
| 7,729,911 B2* | 6/2010 | Chengalvarayan et al. | 704/245 |
| 7,881,929 B2* | 2/2011 | Chengalvarayan et al. | 704/233 |
| 2004/0138882 A1* | 7/2004 | Miyazawa | 704/233 |
| 2005/0071159 A1* | 3/2005 | Boman et al. | 704/233 |
| 2005/0181755 A1* | 8/2005 | Hoshino et al. | 455/272 |
| 2006/0253282 A1* | 11/2006 | Schmidt et al. | 704/233 |
| 2007/0019825 A1* | 1/2007 | Marumoto et al. | 381/94.1 |
| 2007/0072550 A1 | 3/2007 | Wang et al. | |
| 2007/0297619 A1* | 12/2007 | Pan | 381/71.11 |
| 2008/0010057 A1* | 1/2008 | Chengalvarayan et al. | 704/9 |
| 2008/0010065 A1* | 1/2008 | Bratt et al. | 704/246 |
| 2008/0021706 A1* | 1/2008 | Bruwer | 704/233 |
| 2008/0147308 A1* | 6/2008 | Howard et al. | 701/200 |
| 2009/0022330 A1* | 1/2009 | Haulick et al. | 381/57 |
| 2009/0030679 A1* | 1/2009 | Chengalvarayan et al. | 704/233 |
| 2009/0076814 A1* | 3/2009 | Lee | 704/233 |
| 2009/0119096 A1* | 5/2009 | Gerl et al. | 704/207 |
| 2011/0029196 A1* | 2/2011 | Escott | 701/36 |
| 2012/0076315 A1* | 3/2012 | Hetherington et al. | 381/71.4 |

FOREIGN PATENT DOCUMENTS

| | | |
|---|---|---|
| KR | 10-0784456 | 12/2007 |
| KR | 10-2008-0066733 | 7/2008 |

OTHER PUBLICATIONS

Hadley, M.; Milner, B.; Harvey, R.; , "Noise Reduction for Driver-To-Pit-Crew Communication in Motor Racing," Acoustics, Speech and Signal Processing, 2006. ICASSP 2006 Proceedings. 2006 IEEE International Conference on , vol. 1, no., pp. I, May 14-19, 2006.*

Scalart, P.; Filho, J.V.; , "Speech enhancement based on a priori signal to noise estimation," Acoustics, Speech, and Signal Processing, 1996. ICASSP-96. Conference Proceedings., 1996 IEEE International Conference on , vol. 2, no., pp. 629-632 vol. 2, May 7-10, 1996.*

Mouchtaris, A. et al, "A Spectral Conversion Approach to Single-Channel Speech Enhancement," Audio, Sppech, and Language Processing, IEEE, vol. 15, No. 4, May 2007.

Hwa Soo Kim et al, "Speech enhancement via Mel-scale Wiener filtering with a frequency-wise voice activity detector", Journal of Mechanical Science and Technology vol. 21, No. 5 (2007).

* cited by examiner

① initialization: frame_counter=0, back_ground=0, EPD_feat_sum=0
② frame_counter++
③ if(frame_counter<10) then, {
        EPD_feat_sum+ =EPD_feat;
        Back_ground=EPD_feat_sum/frame_counter;
        }
  else{
        if((EPD_feat-back_ground)>threshold) then, VAD=1;
        else{
            VAD=0;
            Update back_ground with EPD_feat;
        }
  }

FIG. 8

① characteristic extraction from speech frame for voiced frame detection
- car noise robust band energy feature (EPD_feat), already extracted
- high-to-low band energy ratio estimation (HLBER)
- zero-crossing rate (ZCR)
- evel-crossing rate (LCR)

② voiced frame detection

```
if((EPD_feat-back_ground)>UV_THRESHOLD) then, flag=1;
else flag=0;

if(flag==1) then, {
        if(HLBER<HLBER_THRESH) then, {
                cnt=0;
                if(ZCR_low<ZCR<ZCR_high) cnt++;
                if(LCR_low<LCR<LCR_high) cnt++;

if(cnt>TH) voiced=1;
                else voiced=0;
        }
        Else voiced=0;
}
Else voiced=0;
```

NOISE REDUCTION FOR SPEECH RECOGNITION IN A MOVING VEHICLE

CROSS-REFERENCE(S) TO RELATED APPLICATION(S)

The present invention claims priority of Korean Patent Application No. 10-2008-0131369, filed on Dec. 22, 2008, which is incorporated herein by reference.

FIELD OF THE INVENTION

The present invention relates to a speech recognition system and method; and, more particularly, to a speech recognition system and method which use characteristics of vehicular noise, thereby being specialized for vehicular environment having limited resources while robust against the vehicular noise.

BACKGROUND OF THE INVENTION

Traveling speed of a vehicle can be classified into high-speed over 100 km/h, medium-speed from 50 km/h to 100 km/h and low-speed below 50 km/h. Table 1 shows frequency characteristics of vehicular noise according to the traveling speed.

TABLE 1

| TRAVELLING SPEED | NOISE FREQUENCY | MAJOR NOISE SOURCE |
| --- | --- | --- |
| LOW-SPEED | 30 Hz-60 Hz | ENGINE TORQUE |
| MEDIUM-SPEED | 60 Hz-100 Hz | ENGINE TORQUE |
| HIGH-SPEED | 100 Hz-120 Hz | ENGINE TORQUE |

As shown in Table 1, vehicular noise occurring during vehicle driving is mainly caused by an engine torque, and has different frequency characteristics according to the traveling speed. The vehicular noise due to the engine torque is characterized in that its energy is concentrated within a relatively low frequency band.

Besides the engine torque, interference is increased with an increase of the traveling speed due to various noise sources, e.g., friction between the road surface and tires, impact due to an irregular road surface and friction between a vehicle and the air. The vehicular noise due to the above-described various noise sources has time-varying frequency characteristics and, unlike the vehicular noise due to the engine torque, is characterized in that its energy is widely distributed over frequency bands, thereby serving as a major factor of distortion of an input speech signal and deterioration of performance of a speech recognition system. In general, speech recognition performance is significantly deteriorated when the traveling speed is over 100 km/h.

As for the frequency characteristics of the vehicular noise, a frequency band of impact sound due to a vehicle engine cycle is in a range from 40 Hz to 200 Hz, a frequency band of friction sound between the road surface and tires is in a range from 100 Hz to 1000 Hz, a frequency band of resonant noise of engine sound is in a range from 300 Hz to 500 Hz and a frequency band of impact sound due to the irregular road surface is in a range from 30 Hz to 60 Hz. Meanwhile, frequency characteristics of noise due to external air flow during vehicle driving is similar to that of white noise, i.e., such noise is not limited to a specific frequency band but distributed over the entire frequency band.

Additive noise for a vehicle traveling at the low-speed or medium-speed relatively less distorts a speech signal, because it is concentrated within relatively narrow low frequency bands. However, additive noise at the high-speed becomes a major factor of distortion of the speech signal, because it is dispersed over relatively wide frequency bands.

Conventional speech recognition systems embedded in a vehicle have problems caused by an increase of driving noise, e.g., distortion of an input speech signal, performance degradation of a VAD (Voice Activity Detector) and performance degradation in end point detection. Further, the conventional speech recognition systems employ speech recognition decoders based on a single acoustic model without taking the traveling speed of the vehicle into consideration. Therefore, the conventional speech recognition systems cannot show excellent recognition result.

SUMMARY OF THE INVENTION

In view of the above, the present invention provides a speech recognition system and method capable of classifying traveling speed level of a vehicle (moving object) to enhance sound quality of speech signals based on the level; detecting VAD features specialized for vehicular environment; effectively detecting start and end points of a voice during vehicle driving; compensating distortion of voice features occurred during voice feature extraction based on the traveling speed level; and decoding the speech signals using multiple acoustic models based on the traveling speed level.

In accordance with an aspect of the present invention, there is provided a speech recognition system, including:

a speed level classifier for measuring a moving speed of a moving object by using a noise signal at an initial time of speech recognition to determine a speed level of the moving object;

a first speech enhancement unit for enhancing sound quality of an input speech signal of the speech recognition by using a Wiener filter, if the speed level of the moving object is equal to or lower than a specific level; and a second speech enhancement unit enhancing the sound quality of the input speech signal of the speech recognition by using a Gaussian mixture model, if the speed level of the moving object is higher than the specific level.

Preferably, the speed level classifier includes a feature extraction unit for calculating a mean log-scale energy value of a specific number of frames, excluding frames having maximum and minimum log-scale energy values, at the initial time of the speech recognition; and a level classification unit for classifying the speed level of the moving object based on the mean log-scale energy value by using maximum and minimum thresholds.

Preferably, the maximum and minimum thresholds depend on a type of the moving object.

Preferably, the first speech enhancement unit includes a transform unit for performing fast Fourier transform on a single frame of the input speech signal; an adder for calculating a sum of signals in a specific frequency band of the fast Fourier transformed signal; a divider for dividing the sum of the signals by a number of fast Fourier transform bins of the transform unit; and a feature extraction unit for converting the divided sum into a log-scale form to extract therefrom voice activity detector characteristics, wherein filter values of the Wiener filter are calculated based on the voice activity detector characteristics extracted by the feature extraction unit, and the input speech signal is filtered by using the calculated filter values.

Preferably, the second speech enhancement unit includes a Gaussian mixture model database for storing therein a power spectral density of clean speech; a first power spectral density calculation unit for estimating a de-noised power spectral density of the input speech signal; a zero-mean calculation unit for calculating a zero-mean power spectral density by using the de-noised power spectral density; a second power spectral density calculation unit for calculating a first clean speech power spectral density by using the power spectral density stored in the Gaussian mixture model database and the zero-mean power spectral density; and a third power spectral density calculation unit for calculating a second clean speech power spectral density by using the de-noised power spectral density and the first clean speech power spectral density, wherein frequency response characteristics of a Wiener filter is acquired by using the second clean speech power spectral density, and then the sound quality of the input speech signal is enhanced based on the frequency response characteristics.

The speech recognition system may further include an end point detection unit for detecting start and end points of the speech signal output from the first speech enhancement unit or the second speech enhancement unit.

Preferably, the end point detection unit detects the start and end points by calculating end point detection features of ten or more frames in the signal output from the first speech enhancement unit or the second speech enhancement unit and comparing a sum of the calculated end point detection features with a threshold.

The speech recognition system may further include a voice/non-voice determination unit for determining whether the signal output from the first speech enhancement unit or the second speech enhancement unit is a voice signal or non-voice signal, wherein the end point detection unit detects the start and end points only if the voice/non-voice determines that the signal output from the first speech enhancement unit or the second speech enhancement unit is the voice signal.

The speech recognition system may further include an elimination unit for eliminating, from the signal output from the first speech enhancement unit and having been subjected to end point detection by the end point detection unit, sudden noise components occurring when the moving object moves based on a sudden noise Gaussian mixture model.

The speech recognition system may further include a decoder for decoding a signal output from the elimination unit by using a low-speed/medium-speed acoustic model database.

The speech recognition system may further include an elimination unit for compensating distorted harmonic components of the signal output from the second speech enhancement unit and having been subjected to end point detection by the end point detection unit based on a harmonic Gaussian mixture model, and eliminating, from the compensated signal, sudden noise components occurring when the moving object moves based on a sudden noise Gaussian mixture model.

The speech recognition system may further include a decoder for decoding a signal output from the elimination unit by using a high-speed acoustic model database.

In accordance with another aspect of the present invention, there is provided a speech recognition method, including:
determining a speed level of a moving object by using a noise signal at an initial time of speech recognition;
enhancing, if the speed level is lower than a specific level, sound quality of an input speech signal by extracting voice activity detection features robust against vehicular noise and applying to the input speech signal a Wiener filter using the extracted voice activity detection features;
detecting start and end points of a signal having been subjected to the sound quality enhancement, if the speed level is lower than a specific level;
eliminating sudden noise components occurring when the moving object moves based on a sudden noise Gaussian mixture model, if the speed level is lower than a specific level; and
decoding a signal having been subjected to the sudden noise elimination by using a low-speed/medium-speed acoustic model database, if the speed level is lower than a specific level.

Preferably, said determining the speed level includes calculating a mean log-scale energy value of a specific number of frames, excluding frames having maximum and minimum log-scale energy values, at the initial time of the speech recognition; and classifying the speed level of the moving object based on the mean log-scale energy value by using maximum and minimum thresholds.

Preferably, the maximum and minimum thresholds depend on a type of the moving object.

Preferably, the said enhancing the sound quality includes performing fast Fourier transform on a single frame of the input speech signal; calculating a sum of signals in a specific frequency band of the fast Fourier transformed signal; dividing the sum of the signals by a number of fast Fourier transform bins; converting the divided sum into a log-scale form to extract therefrom voice activity detector characteristics; calculating filter values of the Wiener filter based on the voice activity detector characteristics; and filtering the input speech signal by using the calculated filter values.

Preferably, said detecting the star and end points includes determining whether the signal having been subjected to the speech enhancement is a voice signal or non-voice signal, wherein the start and end points are detected only if the signal having been subjected to the speech enhancement is determined to be the voice signal.

The speech recognition method may further include enhancing the sound quality of the input speech signal of the speech recognition by applying a Wiener filter using a Gaussian mixture model, if the speed level of the moving object is higher than the specific level; detecting start and end points of a signal having been subjected to the sound quality enhancement, if the speed level is higher than the specific level; compensating distorted harmonic components of the signal having been subjected to end point detection based on a harmonic Gaussian mixture model, if the speed level of the moving object is higher than the specific level; eliminating sudden noise components occurring when the moving object moves based on a sudden noise Gaussian mixture model, if the speed level of the moving object is higher than the specific level; and decoding a signal having been subjected to the compensation and the sudden noise elimination by using a high-speed acoustic model database, if the speed level of the moving object is higher than the specific level.

Preferably, said enhancing the sound quality if the speed level is higher than the specific level includes estimating a de-noised power spectral density of the input speech signal; calculating a zero-mean power spectral density by using the de-noised power spectral density; calculating a first clean speech power spectral density by using a power spectral density of clean speech and the zero-mean power spectral density; calculating a second clean speech power spectral density by using the de-noised power spectral density and the first clean speech power spectral density; acquiring frequency response characteristics of the Wiener filter using the Gaussian mixture model by using the second clean speech power spectral density; and enhancing the sound quality of the input speech signal based on the frequency response characteristics.

According to the present invention, enhancement of sound quality of a speech signal is carried out based on a traveling speed level of a vehicle, and based thereon start and end points are detected. After that, the speech signal is decoded by using an acoustic model appropriate to the traveling speed level. Therefore, performance of speech recognition in vehicular environment can be improved even with limited resources.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings, which form a part hereof.

Figure 1:
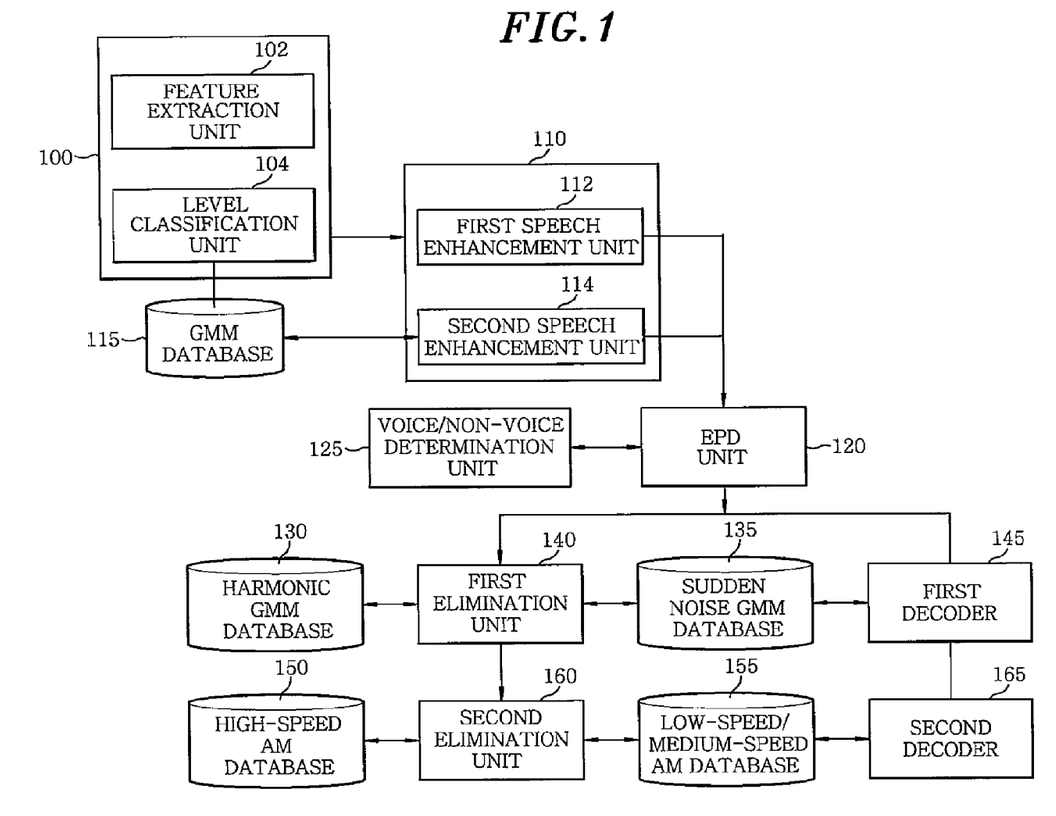
FIG. 1 illustrates a block diagram of a speech recognition system for vehicles in accordance with an embodiment of the present invention.

FIG. 1 illustrates a block diagram of a speech recognition system for vehicles in accordance with an embodiment of the present invention.

The speech recognition system includes a car speed level classifier 100, a speech enhancer 110, a GMM (Gaussian Mixture Model) database 115, an EPD (End Point Detection) unit 120, a voice/non-voice determination unit 125, a harmonic GMM database 130, a sudden noise GMM database 135, first and second elimination units 140 and 145, a high-speed AM (Acoustic Model) database 150, a low-speed/medium-speed AM database 155 and first and second decoders 160 and 165.

The car speed level classifier 100 measures, when a driver presses a speech recognition start button via interface manipulation, a traveling speed of a vehicle by using an input noise signal at an initial time of speech recognition. Then, the car speed level classifier 100 classifies the traveling speed of the vehicle into one of car speed levels "high-speed", "medium-speed" and "low-speed". The car speed level classifier 100 has a feature extraction unit 102 and a level classification unit 104.

The feature extraction unit 102 calculates a mean log-scale energy value of eight frames. The eight frames are obtained by excluding a frame having the maximum log-scale energy value and a frame having the minimum log-scale energy value from ten frames of the initial time of the speech recognition. The level classification unit 104 determines the car speed level of the vehicle based on the mean log-scale energy value.

The feature extraction unit 102 calculates a time-domain signal power Power(k) and a log-scale energy value LSP(k) for each frame k as in Equations 1 and 2, respectively, and then calculates a mean log-scale energy value CLSC_feat of selected eight frames as in Equation 3:

$$\text{Power}(k) = \sum_{n=0}^{N} |x(k \times Ts + n)|^2,$$ Equation 1

$$LSP(k) = \left[ \log\left(1 + \frac{\text{Power}(k)}{64}\right) \right] \times 16,$$ Equation 2

$$CSLC\_feat = \frac{\sum_{k=0}^{9} LSP(k) - \max_k [LSP(k)] - \min_k [LSP(k)]}{8},$$ Equation 3 wherein N, k and Ts denote a window size, a frame number and a frame shift size, respectively.

The level classification unit 104 determines the car speed level based on the mean value CLSC_feat by using a maximum threshold and a minimum threshold. To be specific, if the mean value CLSC_feat is greater than the maximum threshold, the level classification unit 104 determines the car speed level as the "high-speed". If the mean value CLSC_feat is in a range from the minimum threshold to the maximum threshold, the level classification unit 104 determines the car speed level as the "medium-speed". If the mean value CLSC_feat is less than the minimum threshold, the level classification unit 104 determines the car speed level as the "low-speed".

Setting of the maximum and minimum thresholds depends on whether a vehicle to which the speech recognition system is to be mounted is before-market or after-market. In case of a before-market vehicle, the thresholds can be preset according to a type of the vehicle. However, in case of an after-market vehicle, candidate thresholds for various types of vehicles and an interface for selecting the thresholds are provided, and a user can select a pair of the candidate thresholds as the thresholds via the interface.

The speech enhancer 110 enhances sound quality of the input speech signal based on the car speed level determined by the car speed level classifier 100. The speech enhancer 110 includes a first speech enhancement unit 112 for enhancing sound quality of the input speech signal by using a Wiener filter when the car speed level is the "low-speed" or "medium-speed"; and a second speech enhancement unit 114 for enhancing sound quality of the input speech signal by compensating the speech signal and then using a Gaussian mixture model when the car speed level is the "high-speed".

Figure 2:
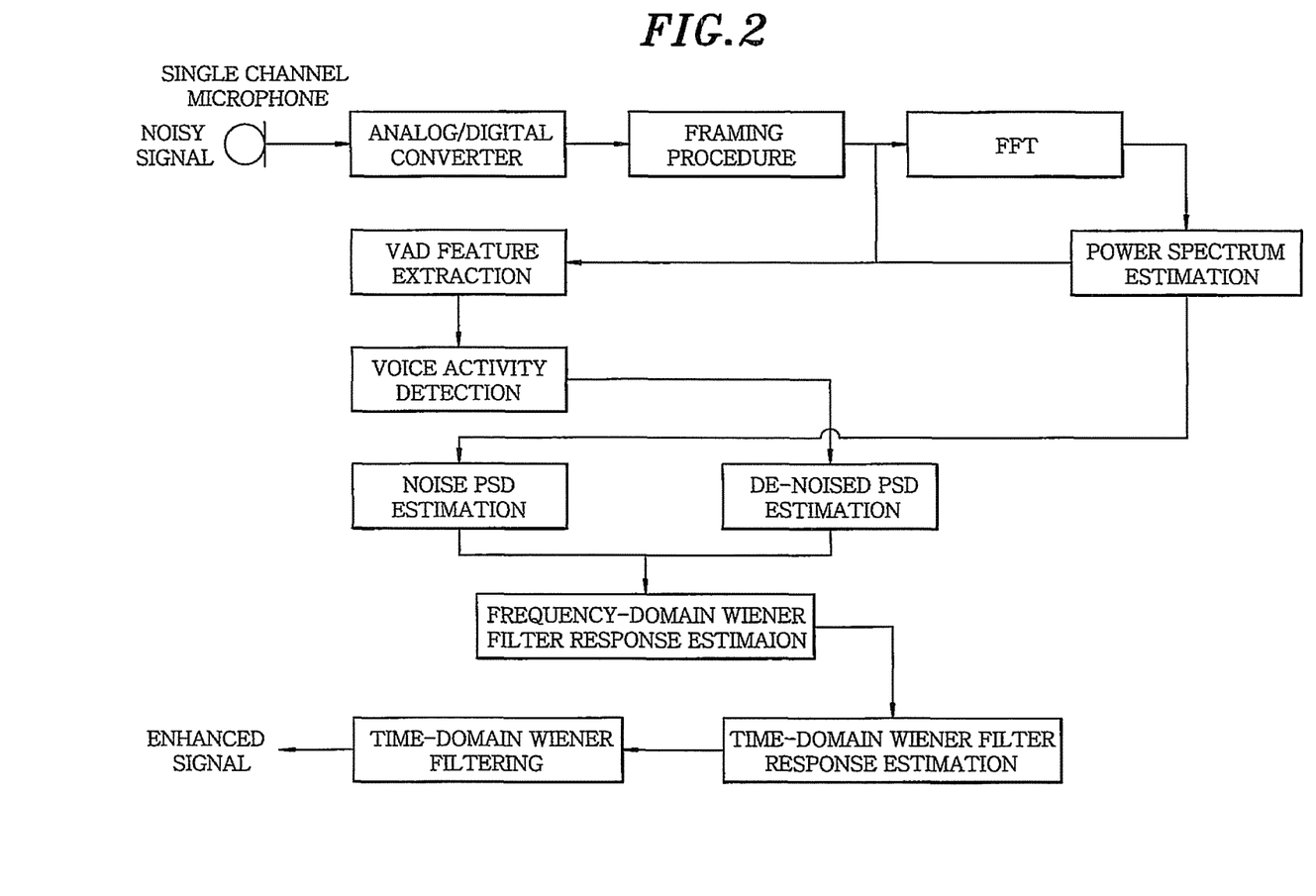
FIG. 2 illustrates a block diagram of a Wiener filter in the first speech enhancement unit of FIG. 1.

FIG. 2 illustrates a block diagram of a Wiener filter in the first speech enhancement unit 112 of FIG. 1.

Among function blocks of the Wiener filter of FIG. 2, the VAD (Voice Activity Detection) feature extraction block may be the most critical part for enhancing the sound quality. As described above, energy of additive noise in vehicular environment is concentrated within low frequency bands. Experiments based on such characteristics showed that energy in the frequency band from 640 Hz to 4000 Hz is robust against vehicular noise in voice activity detection. The present invention suggests features of the VAD feature extraction block robust against the vehicular noise.

Figure 3:
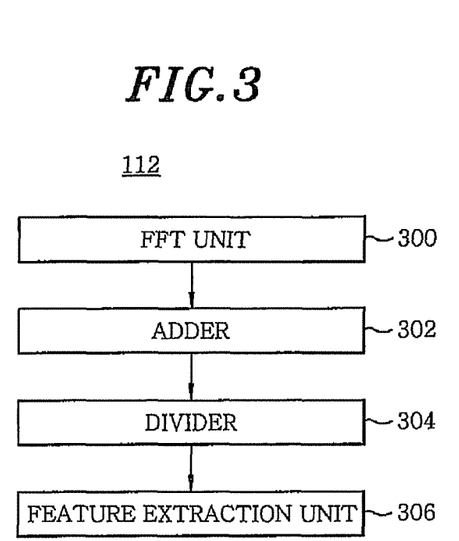
FIG. 3 illustrates a block diagram of a VAD extraction block of the Wiener filter of FIG. 2.

FIG. 3 illustrates a block diagram of a VAD extraction block of the Wiener filter of FIG. 2.

The VAD feature extraction block according to the present invention includes an FFT (Fast Fourier transform) unit 300 for fast-Fourier-transforming a time-domain input signal of one frame; an adder 302 for calculating a sum of FFT values of output signals of the FFT unit 300 in a specific frequency band, e.g., in a car noise robust frequency band of 640 Hz to 4000 Hz; a divider 304 for dividing the sum calculated by the adder 302 by the number of FFT bins; and a feature extraction unit 306 for extracting car noise robust VAD features by transforming the division result of the divider 304 into a log-scale form using Equation 2.

The first speech enhancement unit 112 extracts the car noise robust VAD features by using the above-described VAD feature extraction block and calculates Wiener filter values by using the extracted car noise robust VAD features. Then, the first speech enhancement unit 112 filters input speech signals at the "low-speed" or "medium-speed" by using the calculated Wiener filter values, thereby enhancing the sound quality of the input speech signals.

Figure 4:
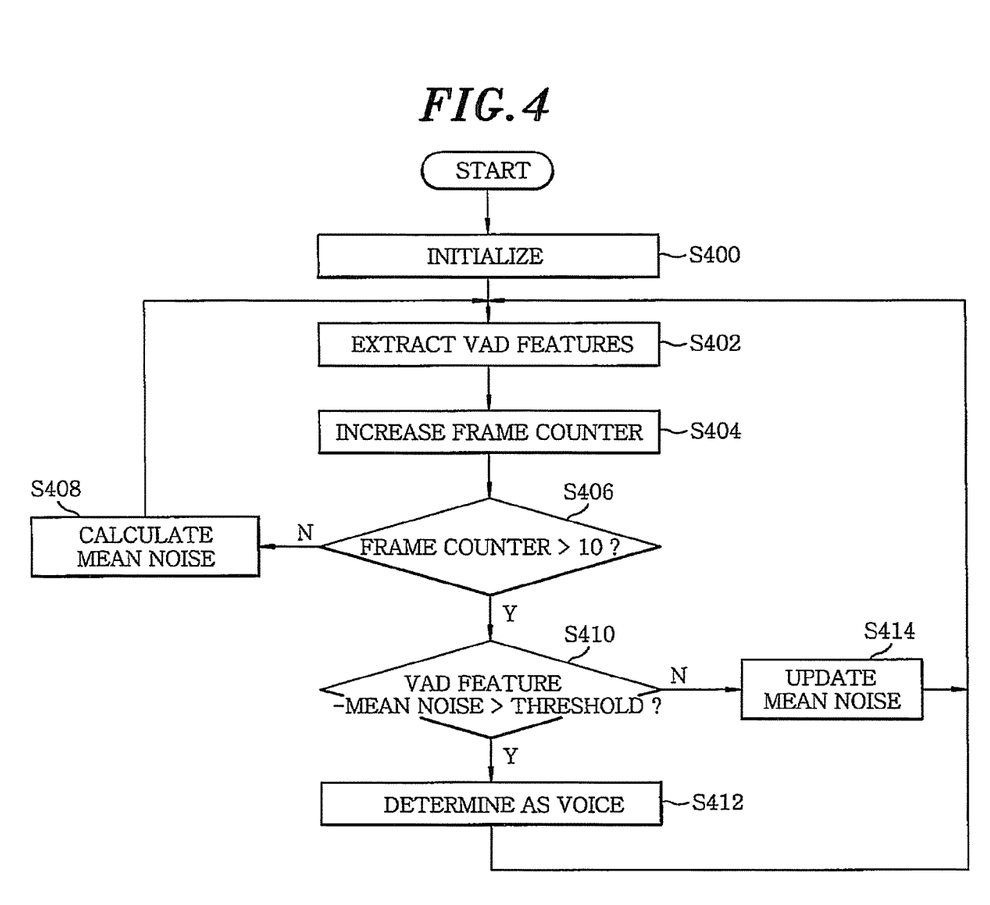
FIG. 4 illustrates a flowchart of operation of the first speech enhancement unit of FIG. 1.

FIG. 4 illustrates a flowchart of operation of the first speech enhancement unit of FIG. 1.

First, a mean noise and a frame counter are initialized to be zero (step S400). Car noise robust VAD features for one frame on the time axis is extracted from an input signal by using the VAD feature extraction block (step S402). The frame counter is increased by one (step S404). It is determined whether the frame counter is greater than ten (step S406). If it is determined in the step S406 that the frame counter is equal to or less than ten, the mean noise is calculated (step S408). The steps S402 to S408 are repeated until the mean noise of initial ten frames is calculated.

If it is determined in the step S406 that the frame counter is greater than ten, a difference "the car robust VAD features— the mean noise" is compared with a threshold (step S410).

If it is determined in the step S410 that the difference is greater than the threshold, a current frame of the input signal is determined as a voice (step S412). If it is determined in the step S410 that the difference is equal to or less than the threshold, the current frame is determined to be background noise and the mean noise is updated as Equation 4:

$$\text{Noise\_mean} = \alpha_n \times \text{Noise\_mean} + (1-\alpha_n) \times \textit{VAD\_feat}, \quad \text{Equation 4}$$

wherein Noise_mean and VAD_feat denote the mean noise and the car robust VAD features of the current frame, respectively, and $\alpha_n$ denotes a forgetting factor having a constant value between 0 and 1.

For a next frame of the input signal, the steps S402 to S414 are also repeated.

Referring back to FIG. 1, when the car speed level classifier 100 determines that the car speed level is the "high-speed", i.e., when the car speed is equal to or higher than 100 km/h, the second speech enhancement unit 114 of the speech enhancer 110 compensates the input speech signal while considering distortion of the input speech signal caused by severe additive noise. To be specific, the second speech enhancement unit 114 compensates frequency components of the input speech signal by using GMM based input speech compensation.

The second speech enhancement unit 114 also uses a Wiener filter. However, the second speech enhancement unit 114 calculates a clean speech de-noised PSD (Power Spectral Density) by using a de-noised PSD estimated by an existing Wiener filter and a Gaussian mixture model of a clean speech, and calculates Wiener filter values based on the clean speech de-noised PSD.

Figure 5:
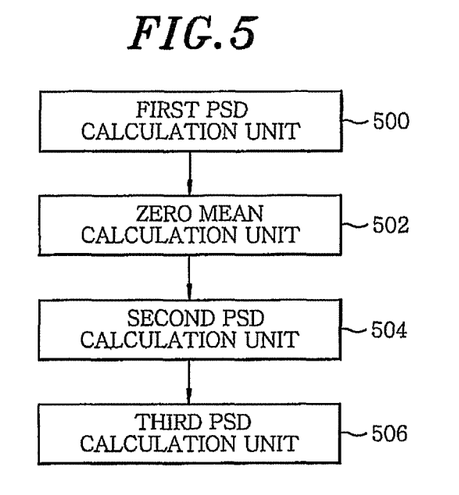
FIG. 5 illustrates a block diagram of the second speech enhancement unit of FIG. 1.

FIG. 5 illustrates a block diagram of the second speech enhancement unit of FIG. 1.

The second speech enhancement unit 114 includes a first PSD calculation unit 500, a zero-mean calculation unit 502, a second PSD calculation unit 504 and a third PSD calculation unit 504. Here, the first PSD calculation unit 500 functions to calculate the de-noised PSD and corresponds to the "DE-NOISED PSD ESTIMATION" of FIG. 2.

The first PSD calculation unit 500 calculates the de-noised PSD $P_{den}^{1/2}(\text{bin},k)$ as Equation 5:

$$P_{den}^{1/2}(\text{bin},k) = W_{con}(\text{bin},k) P_{in}^{1/2}(\text{bin},k), \quad \text{Equation 5}$$

wherein $W_{con}(\text{bin},k)$ denotes estimated frequency characteristics of a Wiener filter, $P_{in}^{1/2}(\text{bin},k)$ denotes a PSD of an input signal, and k denotes a frame number.

The zero-mean calculation unit 502 calculates a zero-mean PSD $P_{feat}^{1/2}(\text{bin},k)$ as Equation 6 by using the de-noised PSD $P_{den}^{1/2}(\text{bin},k)$ in Equation 5:

$$P_{feat}^{1/2}(bin, k) = P_{den}^{1/2}(bin, k) - \frac{1}{N} \sum_{bin=0}^{N-1} P_{den}^{1/2}(bin, k), \quad \text{Equation 6}$$

wherein N denotes the number of frequency bins.

The second PSD calculation unit 504 calculates a clean speech PSD $P_{clean}^{1/2}(\text{bin},k)$ by using the zero-mean PSD $P_{feat}^{1/2}(\text{bin},k)$ in Equation 6 and a Gaussian mixture model for a clean speech stored in the GMM database 115. The second PSD calculation unit 504 calculates the clean speech PSD $P_{clean}^{1/2}(\text{bin},k)$ as Equation 7:

$$P_{clean}^{1/2}(bin, k) = \overline{P_{den}^{1/2}(bin, k)} + \frac{1}{N} \sum_{bin=0}^{N-1} P_{den}^{1/2}(bin, k). \quad \text{Equation 7}$$

In Equation 7, a posteriori probability $p(j|P_{den}^{1/2}(\text{bin},k))$ using a $j_{th}$ Gaussian mixture among M mixtures is calculated according to Bayesian rule as Equation 8:

$$p(j \mid P_{den}^{1/2}(bin, k)) = \frac{p(j) p(P_{feat}^{1/2}(bin, k) \mid j)}{\sum_{j=0}^{M-1} p(j) p(P_{feat}^{1/2}(bin, k) \mid j)}, \quad \text{Equation 8}$$

wherein $p(j|P_{feat}^{1/2}(\text{bin},k))$ denotes an observation probability of an observation vector $P_{feat}^{1/2}(\text{bin},k)$ in the $j_{th}$ Gaussian mixture.

A zero-mean PSD $$\overline{P_{den}^{1/2}(bin, k)}$$

of the clean speech is estimated from the observation vector $P_{feat}^{1/2}(\text{bin},k)$ as Equation 9:

$$\overline{P_{den}^{1/2}(bin, k)} = \sum_{j=0}^{M-1} p(j \mid P_{feat}^{1/2}(bin, k)) \mu_j, \quad \text{Equation 9}$$

wherein $\mu_j$ denotes a mean value of the $j_{th}$ Gaussian mixture.

The third PSD calculation unit 506 calculates a new clean speech PSD $P_{new}^{1/2}(bin,k)$ as Equation 10, in which distortion of the signal in noise environment at the "high-speed" has been compensated, based on the de-noised PSD $P_{den}^{1/2}(bin,k)$ using the existing Wiener filter and the clean speech PSD $P_{clean}^{1/2}(bin,k)$ using the GMM database 115:

$$P_{new}^{1/2}(bin,k) = \beta \times P_{den}^{1/2}(bin,k) + (1-\beta) \times P_{clean}^{1/2}(bin,k) \quad \text{Equation 10}$$

wherein β serving as a weight is a constant between 0 and 1 and can be transcendentally determined via speech recognition experiments using high-speed data.

Frequency response characteristics $W_{new}(bin,k)$ of the Wiener filter, i.e., the Wiener filter values, is calculated by using the new clean speech PSD $P_{new}^{1/2}(bin,k)$, as Equation 11:

$$W_{new}(bin, k) = \frac{\eta(bin, k)}{1 + \eta(bin, k)} \quad \text{Equation 11}$$

$$\eta(bin, k) = \frac{P_{new}^{1/2}(bin, k)}{P_{new}^{1/2}(bin, k)},$$

wherein $P_{noise}^{1/2}(bin,k)$ denotes the magnitude of an estimated noise signal.

The second speech enhancement unit 114 enhances sound quality of the input speech signal at the "high-speed" by applying the Wiener filter values calculated as in Equation 11, and then outputs the result to the EPD unit 120.

The EPD unit 120 detects start and end points from output signal of the first speech enhancement unit 112 or the second speech enhancement unit 114.

In the vehicular environment, a variety of signals is dynamically or periodically flown in. Meanwhile, since EPD characteristics is based on log energy, it is likely to detect noise having such dynamic or periodic characteristics as speech signals. Accordingly, the EPD unit 120 of the present invention performs start and end points detection only on signals determined to be a voice by the voice/non-voice determination unit 125, thereby preventing the above-described erroneous detection and improving EPD performance.

The EPD unit 120 calculates a car noise robust EPD characteristic value for each of ten or more frames in a speech-enhanced signal via the speech enhancer 110 and performs the start and end points detection by comparing a threshold and the sum of calculated EPD characteristic values.

Figure 6:
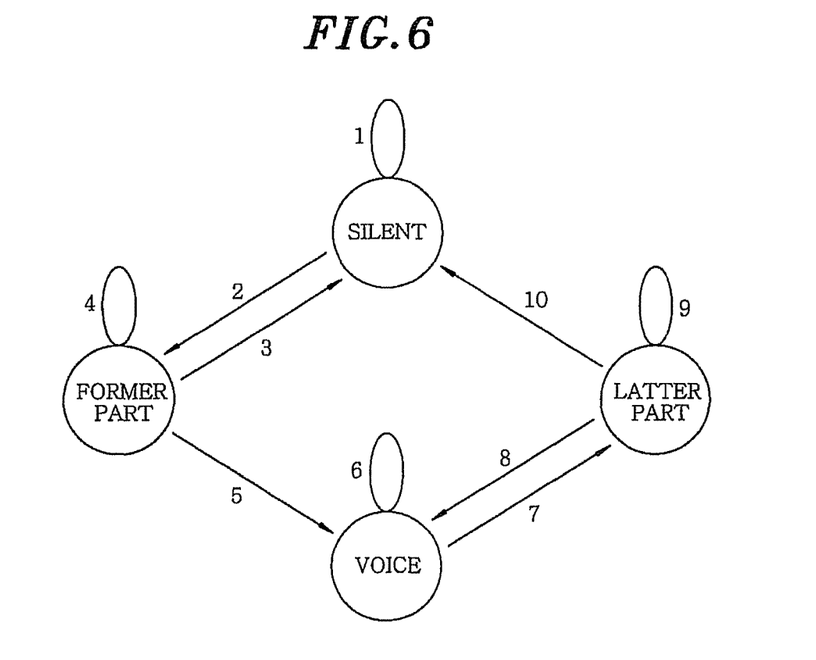
FIG. 6 illustrates an exemplary state diagram of start and end points detection algorithm in accordance with the present invention.

FIG. 6 illustrates an exemplary state diagram of start and end points detection algorithm in accordance with the present invention.

The EPD unit 120 of the present invention performs the start and end points detection based on the result of the voice/non-voice determination unit 125. The voice/non-voice determination unit 125 determines whether a speech-enhanced signal is a voice signal or a non-voice signal by using characteristics of the car noise robust energy band, e.g., an EPD characteristic value, an HLBER (High-to-Low Band Energy Ratio), a ZCR (Zero-to-Crossing Ratio) and an LCR (Level-to-Crossing Ratio), and provides the determination result to the EPD unit 120.

If the signal is determined to be a voice, the EPD unit 120 detects the start and end points of the corresponding signal and outputs them to the first elimination unit 140 or the second elimination unit 145.

The voice/non-voice determination unit 125 calculates the HLBER, ZCR and LCR as in Equations 12 to 14, respectively:

$$HLBER = \frac{highbandE}{lowbandE}, \quad \text{Equation 12}$$

$$ZCR = \sum_{n=0}^{L-2} \frac{1 - \{sgn[x(n)] \times sgn[x(n+1)]\}}{2}, \quad \text{Equation 13}$$

$$LCR = \sum_{n=0}^{L-2} |clip[x(n)] - clip[x(n+1)]|, \quad \text{Equation 14}$$

wherein in Equation 12, highbandE denotes energy of a frequency band from 4 kHz to 8 kHz and lowbandE denotes energy of a frequency band from 280 Hz to 4000 Hz. In Equation 13, sgn[x(n)] denotes a function having a return value of '1' if x(n) is equal to or greater than '0' and otherwise having a return value of '−1' In Equation 14, CL denotes a center clipping level, and clip[x(n)] denotes a function having a return value of '1' if x(n) is equal to or greater than CL, '0' if |x(n)| is less than CL and '−1' if x(n) is less than −CL.

Figure 7:
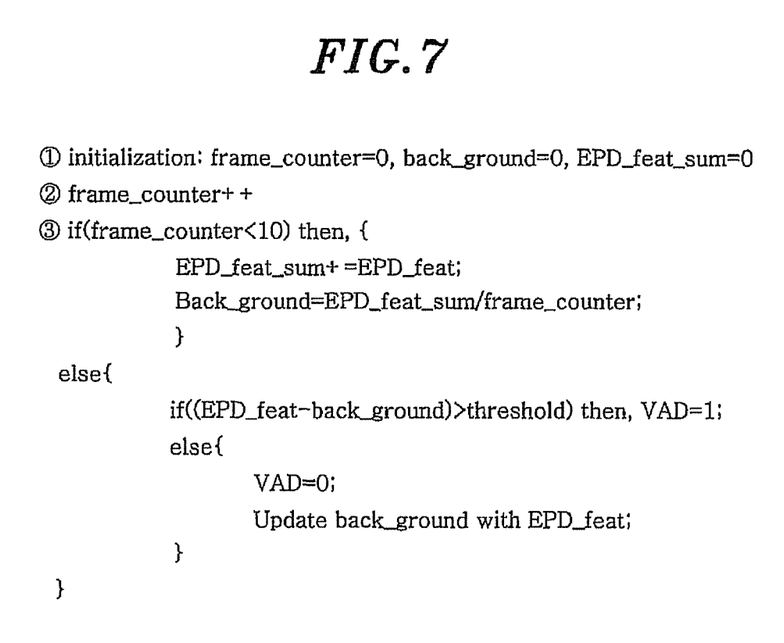
FIG. 7 illustrates an operation algorithm of the EPD detection unit of FIG. 1.
Figure 8:
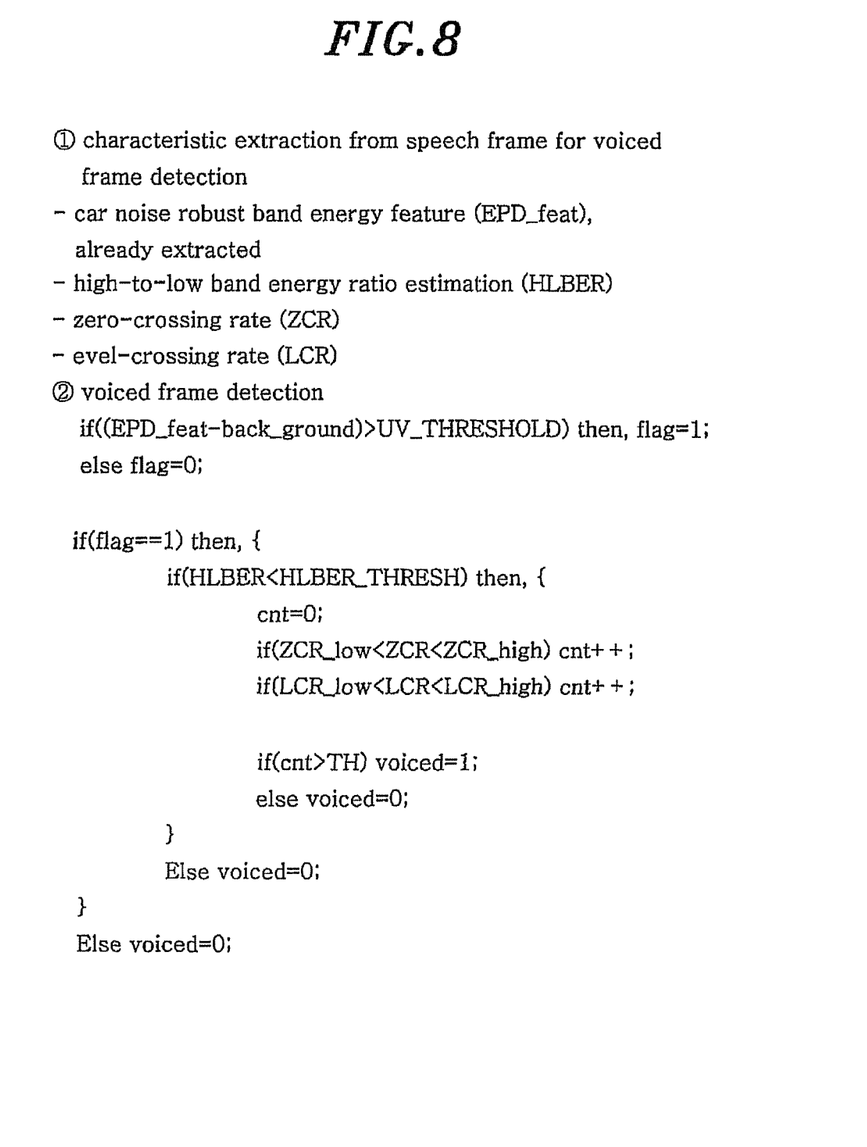
FIG. 8 illustrates an operation algorithm of a voice/non-voice determination unit of FIG. 1.

FIG. 7 illustrates an operation algorithm of the EPD unit 120, and FIG. 8 illustrates an operation algorithm of a voice/non-voice determination unit 125.

The operation algorithms of the EPD unit 120 and the voice/non-voice determination unit 125 are specialized for vehicular environment and are designed so as to be easily applied to terminals having limited amount of resources, e.g., a GPS (Global Positioning System).

The EPD unit 120 and the voice/non-voice determination unit 125 can be used regardless of the car speed, but may have an improved performance when more proper threshold parameters are used according to the car speed level, i.e., the "high-speed", "medium-speed" or "low-speed".

The first elimination unit 140 extracts features by using the harmonic GMM database 130. The harmonic GMM database 130 is constructed as follows.

When constructing the harmonic GMM database 130, time-domain clean speech data is transformed into frequency-domain data, harmonic components are marked on the frequency-domain data semi-automatically or manually, and then a magnitude spectrum in which remaining portions other than the marked harmonic components are set to be zero is constructed. Such magnitude spectrum is called an HCMS (Harmonic Components of Magnitude Spectrum). Since the portions other than the harmonic components have the value of zero as described above, harmonic component portions and non-harmonic component portions can be easily distinguished from each other by checking the magnitude spectrum. The harmonic GMM database 130 is constructed using the HCMS.

The first elimination unit 140 calculates harmonic components $P_h^{1/2}(bin,k)$ of an input signal by using the magnitude spectrum of the input signal and the harmonic GMM database 130 constructed via the above-described procedure, as in Equation 15:

$$P_h^{1/2}(bin, k) = \sum_{j=0}^{M-1} p(j | P_{in}^{1/2}(bin, k))\mu_j, \quad \text{Equation 15}$$

wherein M denotes the number of Gaussian mixtures, and $P_{in}^{1/2}(bin,k)$ denotes the magnitude spectrum of the input signal. Further, bin denotes a frequency bin index of the magnitude spectrum, and k denotes an input frame number.

The posteriori probability $p(j|P_{in}^{1/2}(bin,k))$ using the $j_{th}$ Gaussian mixture is calculated using Bayesian rule as Equation 16:

$$p(j | P_{in}^{1/2}(bin, k)) = \frac{p(j)p(P_{in}^{1/2}(bin, k) | j)}{\sum_{j=0}^{M-1} p(j)p(P_{in}^{1/2}(bin, k) | j)}, \quad \text{Equation 16}$$

wherein j denotes the $j_{th}$ Gaussian mixture.

A magnitude spectrum having improved harmonic components is calculated based on $P_{in}^{1/2}(bin,k)$ and $P_h^{1/2}(bin,k)$ as Equation 17:

$$P_{com}^{1/2}(bin,k) = \alpha \times P_{in}^{1/2}(bin,k) + (1-\alpha) \times P_h^{1/2}(bin,k), \quad \text{Equation 17}$$

wherein α is a constant between 0 and 1, and may be acquired using a transcendental method via speech recognition tests. Feature vectors necessary for speech recognition can be extracted by using $P_{com}^{1/2}(bin,k)$.

In a case where a car speed level of a vehicle is the "high-speed" and an input speech signal is severely distorted, harmonic components of the speech signal can be compensated by using the harmonic GMM database 130 as described above. Accordingly, the performance of a speech recognition system in vehicular environment at the "high-speed" can be improved.

Meanwhile, the first and second elimination units 140 and 145 can eliminate sudden noise. Sudden noise in vehicular environment mainly occurs when a vehicle travels on an irregular road surface. In general, the sudden noise has a relatively short duration and energy thereof is distributed over a frequency band of equal to or less than 1 kHz. However, sudden noise in vehicular environment may have various frequency characteristics because it can be caused by a variety of noise sources.

The first and second elimination units 140 and 145 uses the sudden noise GMM database 135 to mainly eliminate sudden noise occurring on a road surface.

An observation probability Obs_P can be calculated by using an MFCC (Mel-Filter Bank Cepstrum Coefficient) of an observation vector and a sudden noise GMM, as in Equation 18:

$$Obs\_P = \sum_{j=0}^{M-1} p(j)p(MFCC | j). \quad \text{Equation 18}$$

The first and second elimination units 140 and 145 compare the observation probability Obs_P calculated by Equation 18 with a threshold. If the probability Obs_P is greater than the threshold, the first and second elimination units 140 and 145 drop corresponding frames so that improve performance of the speech recognition system in sudden noise environment.

Meanwhile, when the car speed level is the "low-speed" or "medium-speed", the second elimination unit 145 only eliminates sudden noise and outputs the result to the second decoder 165. When the car speed level is the "high-speed", the first elimination unit 140 not only eliminates sudden noise but also compensates harmonic components by using the harmonic GMM database 130 and the sudden noise GMM database 135, and then outputs the result to the first decoder 160.

Both the high-speed AM database 150 and the low-sped/medium-speed AM database 155 are constructed via multi-condition training. However, in the training, the high-speed AM database 150 and the low-sped/medium-speed AM database 155 use different multi-condition HMMs (Hidden Markov Models) different according to the traveling speed of the vehicle.

Particularly, the high-speed AM database 150 is constructed by training a multi-condition HMM reflecting therein characteristics of speech signals distorted in vehicular environment at the "high-speed".

The first decoder 160 performs decoding using the high speed AM database 150, and the second decoder 165 performs decoding using the low-speed/medium-speed AM database 155.

As such, the present invention can prevent degradation in speech recognition performance caused by an HMM model mismatch by checking vehicular environment by using the car speed level classifier and performing speech recognition based on an HMM suitable for the car speed level.

While the invention has been shown and described with respect to the embodiments, it will be understood by those skilled in the art that various changes and modification may be made without departing from the scope of the invention as defined in the following claims.

What is claimed is:

1. A speech recognition system, comprising:
  a microphone receiving a noise signal of a moving object;
  a speed level classifier for measuring a moving speed of the moving object by using the noise signal at an initial time of speech recognition to determine a speed level of the moving object;
  a first speech enhancement unit for enhancing sound quality of an input speech signal of the speech recognition by using a Wiener filter, if the speed level of the moving object is equal to or lower than a specific level; and
  a second speech enhancement unit enhancing the sound quality of the input speech signal of the speech recognition by using a Gaussian mixture model, if the speed level of the moving object is higher than the specific level.

2. The speech recognition system of claim 1, wherein the speed level classifier includes:
  a feature extraction unit for calculating a mean log-scale energy value of a specific number of frames, excluding frames having maximum and minimum log-scale energy values, at the initial time of the speech recognition; and
  a level classification unit for classifying the speed level of the moving object based on the mean log-scale energy value by using maximum and minimum thresholds.

3. The speech recognition system of claim 2, wherein the maximum and minimum thresholds depend on a type of the moving object.

4. The speech recognition system of claim 1, wherein the first speech enhancement unit includes:
  a transform unit for performing fast Fourier transform on a single frame of the input speech signal;
  an adder for calculating a sum of signals in a specific frequency band of the fast Fourier transformed signal;
  a divider for dividing the sum of the signals by a number of fast Fourier transform bins of the transform unit; and
  a feature extraction unit for converting the divided sum into a log-scale form to extract therefrom voice activity detector characteristics,
  wherein filter values of the Wiener filter are calculated based on the voice activity detector characteristics extracted by the feature extraction unit, and the input speech signal is filtered by using the calculated filter values.

5. The speech recognition system of claim 1, wherein the second speech enhancement unit includes:
   a Gaussian mixture model database for storing therein a power spectral density of clean speech;
   a first power spectral density calculation unit for estimating a de-noised power spectral density of the input speech signal;
   a zero-mean calculation unit for calculating a zero-mean power spectral density by using the de-noised power spectral density;
   a second power spectral density calculation unit for calculating a first clean speech power spectral density by using the power spectral density stored in the Gaussian mixture model database and the zero-mean power spectral density; and
   a third power spectral density calculation unit for calculating a second clean speech power spectral density by using the de-noised power spectral density and the first clean speech power spectral density,
   wherein frequency response characteristics of a Wiener filter is acquired by using the second clean speech power spectral density, and then the sound quality of the input speech signal is enhanced based on the frequency response characteristics.

6. The speech recognition system of claim 1, further comprising an end point detection unit for detecting start and end points of the speech signal output from the first speech enhancement unit or the second speech enhancement unit.

7. The speech recognition system of claim 6, wherein the end point detection unit detects the start and end points by calculating end point detection features of ten or more frames in the signal output from the first speech enhancement unit or the second speech enhancement unit and comparing a sum of the calculated end point detection features with a threshold.

8. The speech recognition system of claim 6, further comprising:
   a voice/non-voice determination unit for determining whether the signal output from the first speech enhancement unit or the second speech enhancement unit is a voice signal or non-voice signal,
   wherein the end point detection unit detects the start and end points only if the voice/non-voice determines that the signal output from the first speech enhancement unit or the second speech enhancement unit is the voice signal.

9. The speech recognition system of claim 6, further comprising an elimination unit for eliminating, from the signal output from the second enhancement unit and having been subjected to end point detection by the end point detection unit, sudden noise components occurring when the moving object moves based on a sudden noise Gaussian mixture model.

10. The speech recognition system of claim 9, further comprising a decoder for decoding a signal output from the elimination unit by using a low-speed/medium-speed acoustic model database.

11. The speech recognition system of claim 6, further comprising an elimination unit for compensating distorted harmonic components of the signal output from the second speech enhancement unit and having been subjected to end point detection by the end point detection unit based on a harmonic Gaussian mixture model, and eliminating, from the compensated signal, sudden noise components occurring when the moving object moves based on a sudden noise Gaussian mixture model.

12. The speech recognition system of claim 11, further comprising a decoder for decoding a signal output from the elimination unit by using a high-speed acoustic model database.

13. A speech recognition method, comprising:
   determining a speed level of a moving object by using a noise signal at an initial time of speech recognition;
   if the speed level is equal to or lower than a specific level,
      enhancing sound quality of an input speech signal by extracting voice activity detection features robust against vehicular noise and applying to the input speech signal a Wiener filter using the extracted voice activity detection features;
      detecting start and end points of a signal having been subjected to the sound quality enhancement;
      eliminating sudden noise components occurring when the moving object moves based on a sudden noise Gaussian mixture model; and
      decoding a signal having been subjected to the sudden noise elimination by using a low-speed/medium-speed acoustic model database, and
   if the speed level is higher than the specific level,
      enhancing the sound quality of the input speech signal of the speech recognition by applying a Wiener filter using a Gaussian mixture model;
      detecting start and end points of a signal having been subjected to the sound quality enhancement;
      compensating distorted harmonic components of the signal having been subjected to end point detection based on a harmonic Gaussian mixture model;
      eliminating sudden noise components occurring when the moving object moves based on a sudden noise Gaussian mixture model; and
      decoding a signal having been subjected to the compensation and the sudden noise elimination by using a high-speed acoustic model database.

14. The speech recognition method of claim 13, wherein said determining the speed level includes:
   calculating a mean log-scale energy value of a specific number of frames, excluding frames having maximum and minimum log-scale energy values, at the initial time of the speech recognition; and
   classifying the speed level of the moving object based on the mean log-scale energy value by using maximum and minimum thresholds.

15. The speech recognition method of claim 14, wherein the maximum and minimum thresholds depend on a type of the moving object.

16. The speech recognition method of claim 13, wherein the said enhancing the sound quality includes:
   performing fast Fourier transform on a single frame of the input speech signal;
   calculating a sum of signals in a specific frequency band of the fast Fourier transformed signal;
   dividing the sum of the signals by a number of fast Fourier transform bins;
   converting the divided sum into a log-scale form to extract therefrom voice activity detector characteristics;
   calculating filter values of the Wiener filter based on the voice activity detector characteristics; and
   filtering the input speech signal by using the calculated filter values.

17. The speech recognition method of claim 13, wherein said detecting the star and end points includes:

determining whether the signal having been subjected to the speech enhancement is a voice signal or non-voice signal, wherein the start and end points are detected only if the signal having been subjected to the speech enhancement is determined to be the voice signal.

18. The speech recognition method of claim 13, wherein said enhancing the sound quality if the speed level is higher than the specific level includes:

estimating a de-noised power spectral density of the input speech signal;

calculating a zero-mean power spectral density by using the de-noised power spectral density;

calculating a first clean speech power spectral density by using a power spectral density of clean speech and the zero-mean power spectral density;

calculating a second clean speech power spectral density by using the de-noised power spectral density and the first clean speech power spectral density;

acquiring frequency response characteristics of the Wiener filter using the Gaussian mixture model by using the second clean speech power spectral density; and enhancing the sound quality of the input speech signal based on the frequency response characteristics.

\* \* \* \* \*